US006758007B1

(12) United States Patent
Schneider

(10) Patent No.: US 6,758,007 B1
(45) Date of Patent: *Jul. 6, 2004

(54) TWISTED FLY LINE LEADER

(76) Inventor: Friedrich R. Schneider, Hill's Point Road, St. Stephen, New Brunswick (CA), E3L 2W9

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 779 days.

(21) Appl. No.: 09/196,687

(22) Filed: Nov. 20, 1998

Related U.S. Application Data

(62) Division of application No. 08/911,030, filed on Aug. 13, 1997.

(51) Int. Cl.[7] .............................................. A01K 91/00
(52) U.S. Cl. ..................................................... 43/44.98
(58) Field of Search .............................. 43/44.98; 87/6; 57/230

(56) References Cited

U.S. PATENT DOCUMENTS

| 317,729 | A |   | 5/1885  | Clark et al. |            |
|---------|---|---|---------|--------------|------------|
| ,337,944 | A |   | 3/1886  | Forster      |            |
| 337,944 | A | * | 3/1886  | Forester     | 43/44.98   |
| ,341,257 | A |   | 5/1886  | Mansfield    |            |
| 396,130 | A | * | 1/1889  | Willoughby   | 43/44.98   |
| 1,394,616 | A | * | 10/1921 | Fredricks   | 43/44.98   |
| 1,501,953 | A | * | 7/1924  | Leslie       | 43/44.98   |
| 2,056,506 | A | * | 10/1936 | Dopp         | 43/44.98   |
| 2,108,598 | A | * | 2/1938  | Burr         | 43/44.98   |
| 2,242,341 | A |   | 5/1941  | Brignall     |            |
| 2,326,621 | A |   | 8/1943  | Corda        |            |
| 2,481,587 | A |   | 9/1949  | Gregory      |            |
| 2,690,027 | A | * | 9/1954  | Russell      | 43/44.98   |
| 3,028,720 | A |   | 4/1962  | Houk         |            |
| 3,208,036 | A |   | 9/1965  | Harrison     |            |
| 3,273,605 | A |   | 9/1966  | Ferrara, Jr. |            |
| 3,704,578 | A |   | 12/1972 | Myers        |            |
| 3,831,309 | A | * | 8/1974  | Martuch      | 43/44.98   |
| 3,990,486 | A |   | 11/1976 | Quick        |            |
| 4,258,608 | A | * | 3/1981  | Brown        | 87/6       |
| 4,604,821 | A | * | 8/1986  | Moser        | 43/44.98   |
| 4,779,372 | A | * | 10/1988 | Pozo Obeso   | 43/44.98   |
| 5,517,813 | A |   | 5/1996  | Klundt       |            |
| 5,603,207 | A |   | 2/1997  | Hartman      |            |

* cited by examiner

*Primary Examiner*—Kurt Rowan
(74) *Attorney, Agent, or Firm*—Trevor C. Klotz

(57) ABSTRACT

A fly line leader made from a single length of monofilament line that is folded upon itself to provide at least four strand portions that are twisted together. The leader has a loop at each of opposite ends thereof provided by the single length of monofilament line with the result of no enlargement at the transition from the main portion of the leader to the loop. The monofilament line preferably is nylon with a cross-sectional diameter in the range of 0.1 mm to 0.5 mm. A simple twister mechanism is described whereby the fisherman can make his own leader matched to his own preferences by selection of line stiffness, line diameter, and degree of twisting.

5 Claims, 2 Drawing Sheets

TWISTED FLY LINE LEADER

This application is a divisional of U.S. application Ser. 08/911,030 filed Aug. 13, 1997.

FIELD OF INVENTION

This invention relates generally to fly fishing and more particularly to a multi-strand, twisted, tapered, leader made from a single length of monofilament line as well as a method of making such leader and an apparatus for making the twisted leader. The strands of the leader are twisted together except for a minor portion at each of opposite ends thus providing a multi-strand, twisted, tapered, leader having integral therewith a loop at each of opposite ends thereof.

BACKGROUND OF INVENTION

Fly fishing is enjoyed by many and quality manufactured equipment is available. Fishermen in some instances hand make their own flies. The rest of the equipment including leaders is commercially premanufactured.

Fly line leaders that are braided are known and for this reference may be had to pages 48 and 49 of a catalogue of the Orvis Company Headed "Orvis® Spring Fishing and Outdoor 1995 Authentic Products of Lasting Quality for Over 100 Years".

The known braided leader has excellent fishing characteristics, but it is expensive because it requires complicated and expensive factory installed machinery to manufacture the same. This known leader has a loop at each of opposite ends thereof, one for attaching to the loop end of the fly line and the other for attaching thereto the loop end of the tippet. To form these loops the leader end portion is folded back upon itself and the free end interwoven with or braided into the main length of the line. This results in an enlargement in the line near the loop end.

These known leaders are available in specific lengths of 7½, 9, 12 and 16 feet.

SUMMARY OF INVENTION

An object of the present invention is to provide a leader that is simple and inexpensive to manufacture and yet has excellent fishing characteristics.

A further object of the present invention is to provide improved characteristics in a leader made from a monofilament line.

A still further object of the present invention is to provide a simple easy way to make a fly fishing leader whereby the individual fisherman can make his own as needed and with characteristics desired by that individual.

A still further object of the present invention is to provide a relatively inexpensive leader that can be individually custom made incorporating characteristics as dictated by the fish to be caught and/or the fishing conditions as well as in any reasonable length that may be desired.

A still further object of the present invention is to provide a simple apparatus for making applicant's twisted tapered leader.

LIST OF DRAWINGS

DESCRIPTION OF PREFERRED EMBODIMENT

Figure 1:
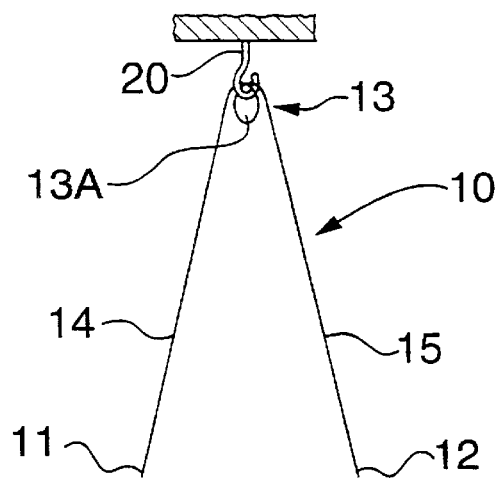
FIG. 1 is a diagrammatic elevational view representing step one in making a leader from a single length of monofilament line.

Referring to the drawings FIG. 1 illustrates a single length of monofilament line 10 suspended from a fixed in position anchor hook 20. The monofilament line 10 has respective opposite ends 11 and 12 and mid-way therebetween the length of monofilament line is looped one and one half times (i.e. 540°), as indicated at 13, around the anchor hook 20. The monofilament line, preferably nylon, thus as illustrated has respective first and second strand parts 14 and 15 each of which is approximately half the length of the single stand 10.

Figure 4:
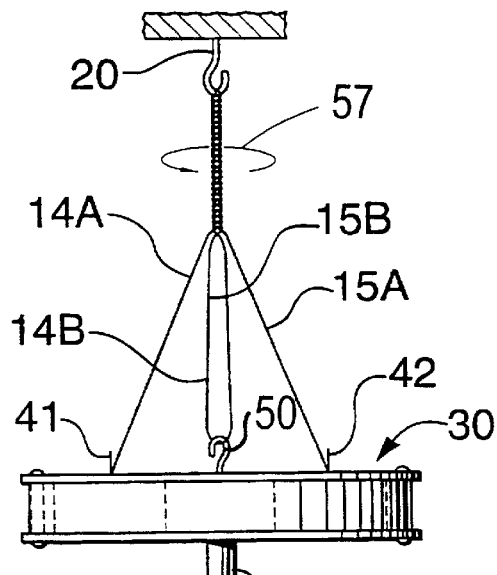
FIG. 4 is similar to FIG. 3 representing step 5 in making the leader.
Figure 5:
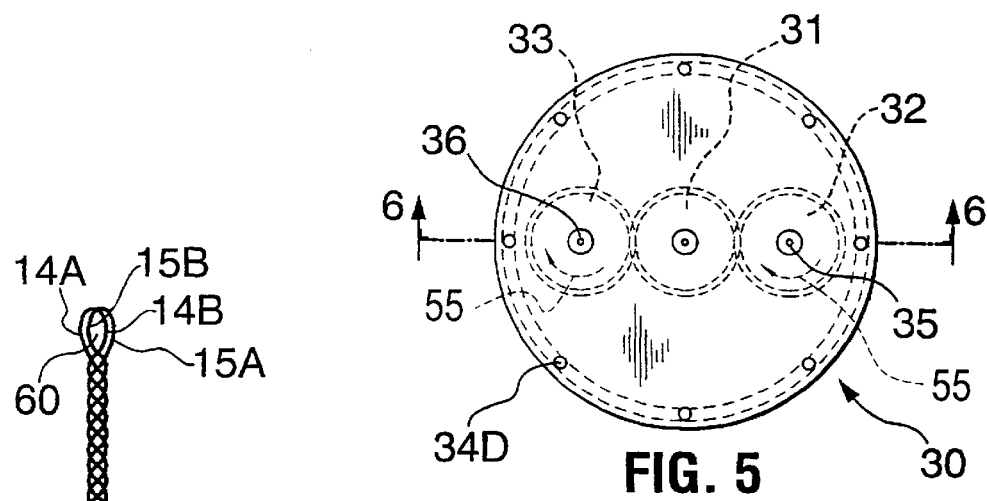
FIG. 5 is a top plan view of the twister mechanism taken essentially along line 5—5 of FIG. 3.
Figure 6:
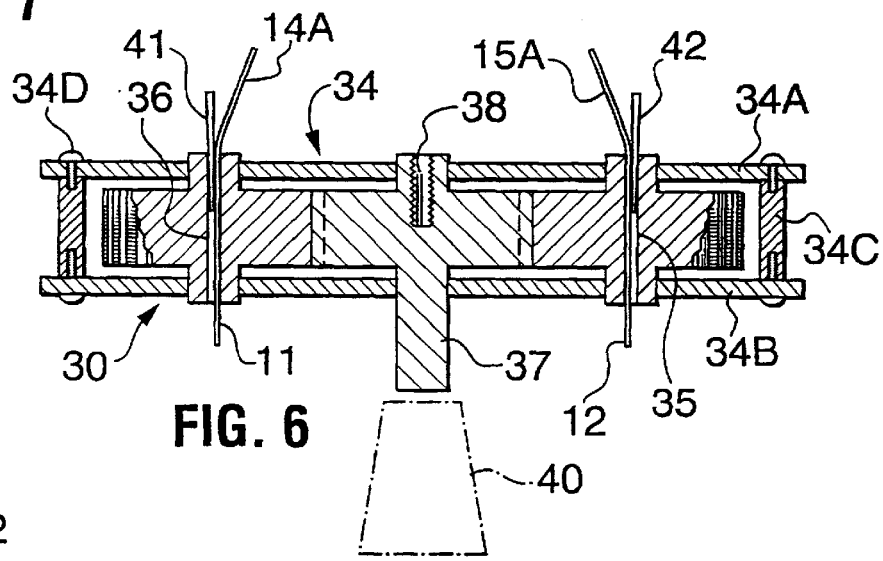
FIG. 6 is a sectional view taken essentially along line 6—6 of FIG. 5.

A twister mechanism 30, to be described in more detail hereinafter, is diagrammatically illustrated in FIGS. 2, 3 and 4 with certain operative details thereof shown in FIGS. 5 and 6. The twister mechanism 30 is shown in its simplest form comprising a drive gear 31 meshing with a pair of planetary gears designated respectively 32 and 33. These gears are located within a suitable casing or housing 34 and by any suitable bearing means are journalled for rotation on the housing. The planetary gears 32 and 33 have respective centrally disposed recesses or through holes 35 and 36 into which the ends 11 and 12 can be inserted. The strand ends 11 and 12 are anchored to the planetary gears by suitable wedging mechanisms, for example a tapered pin such as a toothpick, designated respectively 41 and 42.

Gear 31 of the twister mechanism has a drive shaft 37 secured thereto and projecting therefrom beyond the casing and which can be readily inserted into the chuck 40 of an electric power drill.

Figure 2:
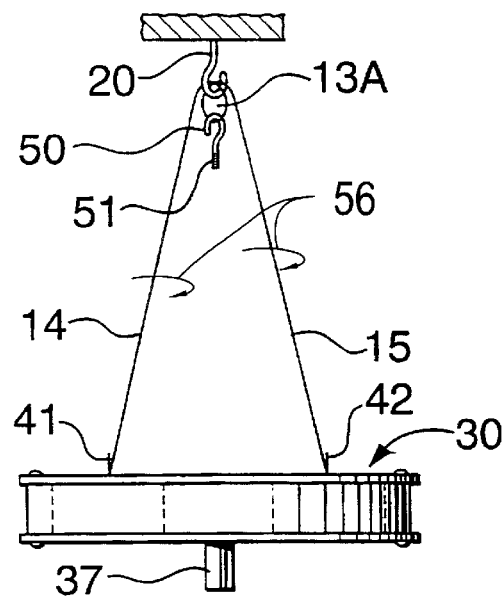
FIG. 2 is a diagrammatic elevational view of the monofilament line attached to a twister mechanism and represents steps 2 and 3 in making the leader.

Referring now back to FIG. 2, with the ends 11 and 12 anchored to the respective planetary gears (described briefly above with reference to FIG. 6) gear 31 is driven via shaft 37. The planetary gears 32 and 33 rotate (both in the same direction as best seen with regard to the gear rotation arrows 55 illustrated in FIG. 5 providing a twist to the respective strand parts 14 and 15. In the same direction as seen from strand rotation arrows 56 in FIG. 2) By way of example a twist of about 200 revolutions per meter length of nylon strand has been found to be suitable. The amount of twist can vary substantially depending upon the characteristics desired for the leader. Less twist provides a softer leader and one with less mass while more twist results in a stiffer leader and one with greater mass. By selecting the amount of twist and/or the diameter of the monofilament line, which can vary from 0.1 mm to 0.5 mm, one can make a leader with desired characteristics. Each leader can thus also be adapted to the fly line which can vary from a #2 to a #14. The weight of unit 30 (or weights attached thereto) is sufficient to keep the twisted strands 14 and 15 straight. Typically the unit will be from 4 to 6 ounces in weight.

With strand parts 14 and 15 each twisted the desired amount and with a hook 50 inserted into the loop lower portion 13a (FIG. 2), the hook is pulled down and attached to the twister mechanism. By way of example the hook 50 may have a threaded stem 51 which threads into a threaded recess 38 in the gear 31. This is diagrammatically illustrated in FIG. 3 and with reference to the same the strand part 14 has now become strand portions 14a and 14b and strand part 15 has become strand portions 15a and 15b. Each strand portion is approximately one quarter the length of the initial single strand and each strand portion has an equal amount of twist. It will be apparent there are in this illustrated embodiment four strand portions to be twisted together.

Figure 3:
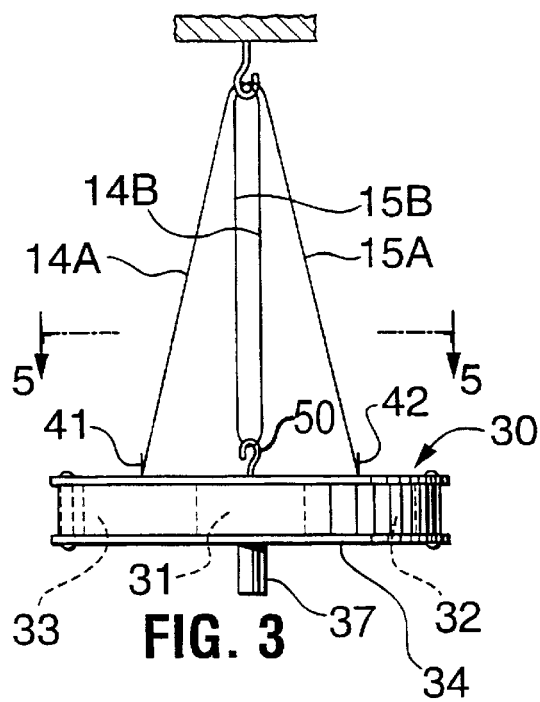
FIG. 3 is a diagrammatic view representing step 4 in making the leader.

With the arrangement as illustrated in FIG. 3 the free hanging leader twister mechanism 30 (suspended from the hook 20 by the four twisted strand portions) is allowed to rotate freely and it is permitted to do so until it comes to rest. The direction of rotation as seen by rotation arrow 57 in FIG. 4 is opposite to that of the initial twist in the strand parts 14 and 15. Created by the foregoing is a multi strand leader with a loop 60 at one end provided by two strand portions 14a and 15a merging as continuations thereof into respective strand portions 14b and 15b. At the other end there is a loop 70 where strand portion 14b merges into strand portion 15b. The other two strands terminate adjacent loop 70 in the free ends 11 and 12.

Figure 7:
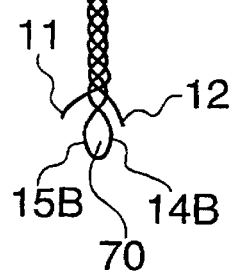
FIG. 7 is a view of a partially completed twisted leader of the present invention.

The strand portions which have been twisted together form a twisted leader of a desired preselected length from a single length of monofilament line with such single length providing a loop at the respective opposite ends of the leader. The leader may be in the range of from 1' to 20' in length. The thus formed leader is illustrated in FIG. 7 and in reference to the same there is the loop 60 at one end and the loop 70 at the other end. The strand ends 11 and 12 are secured to the leader by for example knotting, e.g. a needle knot, or otherwise suitably anchored to prevent unravelling. Before being secured these ends 11 and 12 are preferably unravelled back to different lengths to provide a tapered leader which comprises four strands, then three strands, then two strands all formed from the single length of monofilament line.

Figure 8:
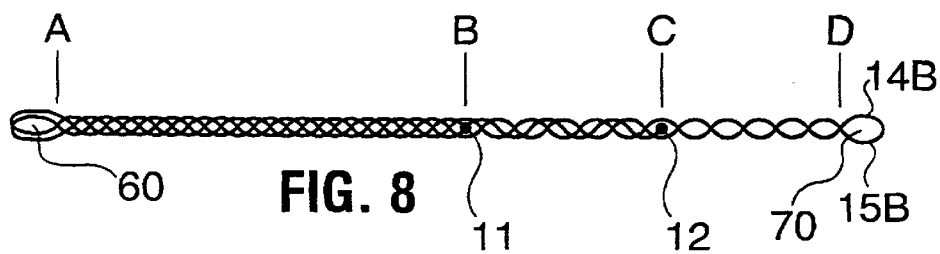
FIG. 8 is a view of a completed twisted tapered leader of the present invention.

The finished product is diagrammatically illustrated in FIG. 8. The tapered leader comprises a first portion from A to B of four strands, a second portion from B to C of three strands and a third portion from C to D of two strands. Integral with the leader are loops 60 and 70 at respective opposite ends thereof.

The term integral herein, with reference to the loops, is meant to exclude constructions of forming loops by knotting, tying or interweaving. The loop is the result of the path followed by the single length of monofilament line from one end 11 to its other opposite end 12, i.e. a portion in the transition from one strand portion to the next.

The leader of the present invention can readily be made by a fly fisherman to suit his needs. The number of turns per meter length of line can be varied so that the leader may be soft or stiff or most anything therebetween. Nylon monofilament line can be purchased as a limp line or a stiff line or most anything therebetween. The nylon as mentioned can also be purchased in diameters ranging from 0.1 mm to 0.5 mm. The maker of the leader can experiment using these different variables to construct a leader having characteristics as may be desired.

The twister mechanism is a simple device that might for example be 2" in diameter, have a thickness of ½" to ¾" and weigh about 4 ounces to 6 ounces.

The casing 34 comprises a pair of plates. 34a and 34b held in spaced relation by a spacer 34c. The spacer 34c may be a continuous wall, i.e. an annular sleeve or a number of posts and the unit is held together by a number of threaded fasteners 34d or other suitable means. The gears have hubs that project into recesses or pass through apertures in the plates. The Plates and gears may be metal and nylon bushings may provide suitable journals for the gear hubs. Alternatively the gear hubs themselves may be made of a nylon material or the gear hubs may be metal and the plates made of nylon.

The leader described and illustrated in the foregoing comprises four strands twisted together with those four strands being provided by a single continuous length of a monofilament line fold upon itself. There may be additional strands if desired and additional planetary gears may be added to the twister mechanism permitting twisting those additional strand lengths. Thus one can make a leader with more than four strands, e.g. 6, 8 or even more.

Some advantageous features of the present invention include:

1. The leader is better balanced in mass and flexibility to the fly line than any leader on the market today;
2. It has a loop-to-loop system without the use of any extra components like braided end loops;
3. The action of the leader can be chosen according to application by using limp or stiff nylon material or a combination of both;
4. The leader can be produced by the individual fisherman to his own liking;
5. A self produced leader is inexpensive;
6. The leader has extraordinary floating quality because of the locked air in the twisted surface of the leader; and
7. The leader has extraordinary sinking quality when the surface of the leader material before twisting and the twisted surface of the leader is coated with sinking material.

I claim:

1. A fly line leader comprising a single twisted length of monofilament line which is folded upon itself to provide at least four strand portions with said strand portions being twisted together and wherein said folds of said single twisted length of monofilament line form integral with said leader at least one knot free loop at each of the opposite ends of said leader.

2. A fly line leader as defined in claim 1 wherein said monofilament line is nylon.

3. A fly line leader as defined in claim 1 wherein said monofilament line has a cross-sectional diameter in the range of 0.1 mm to 0.5 mm and wherein the number of loops in one of said opposite ends of said leader exceeds the number of loops in the other of said opposite ends of said leader by one loop.

4. A fly line leader comprising at least four strands of monofilament line twisted together, said leader having at least one integral knot free loop at each of opposite ends thereof and wherein each of said strands constitute a portion of a single continuous length of monofilament line which has been folded upon itself and wherein said monofilament line has a cross-sectional diameter in the range of 0.1 mm to 0.5 mm.

5. A fly line leader comprising a single twisted length of monofilament line having a cross-sectional diameter in the range of 0.1 mm to 0.5 mm, said monofilament line being folded upon itself to provide at least four strand portions, said strand portions being twisted together and the folds in the line providing at least one knot free loop, integral with the leader, at each of opposite ends of said leader and wherein two of said strand portions terminate at different positions lengthwise of the leader thereby providing a tapered leader comprising four strand portions along a first section of the length of the leader, three strand portions along a next second section of the leader and two strands portions along a next final section of the leader.

* * * * *